United States Patent
Friesem

[11] 3,918,803
[45] Nov. 11, 1975

[54] DISPLAY OF MULTICOLOR IMAGES USING A SCREEN WITH RED, BLUE AND GREEN PHOTOLUMINESCENT SEGMENTS

[75] Inventor: Albert A. Friesem, Rehovot, Israel

[73] Assignee: Harris-Intertype Corporation, Cleveland, Ohio

[22] Filed: May 30, 1974

[21] Appl. No.: 474,783

Related U.S. Application Data

[62] Division of Ser. No. 239,594, March 30, 1972, Pat. No. 3,823,412.

[52] U.S. Cl. ............... 353/121; 250/329; 250/458; 355/77; 350/3.5; 353/84; 353/122
[51] Int. Cl.² .......................................... G03B 21/00
[58] Field of Search ....... 350/3.5, 162 SF, 317, 117, 350/126; 352/66, 67; 354/101–103; 250/329, 458, 461; 358/60, 2; 353/121, 122, 84; 355/2, 77

[56] References Cited
UNITED STATES PATENTS

| | | | |
|---|---|---|---|
| 2,240,844 | 5/1941 | Goggin et al. | 250/329 |
| 2,957,940 | 10/1940 | Cusano | 250/329 |
| 3,549,886 | 12/1970 | Hillborn | 250/461 |
| 3,567,305 | 3/1971 | Collier et al. | 350/3.5 |

FOREIGN PATENTS OR APPLICATIONS

| 6,881 | 5/1906 | United Kingdom | 350/317 |

*Primary Examiner*—Ronald J. Stern
*Assistant Examiner*—Jon W. Henry

[57] ABSTRACT

A multicolor display system including a viewing screen having a multiplicity of closely spaced photoluminescent segments thereon in a regular array of alternating red, blue and green segments. A hologram which was recorded at or near the Fourier transform plane of the input information is positioned relative to the screen to project an image of the recorded information thereon when the hologram is illuminated by a readout beam. The information is recorded in a coded format representative of multiple colors contained in the original subject from which the information was derived.

2 Claims, 6 Drawing Figures

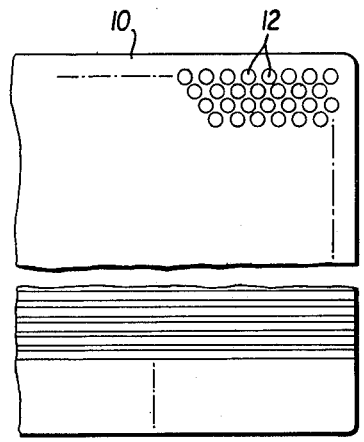
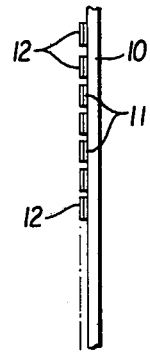
FIG. 1A  FIG. 1B
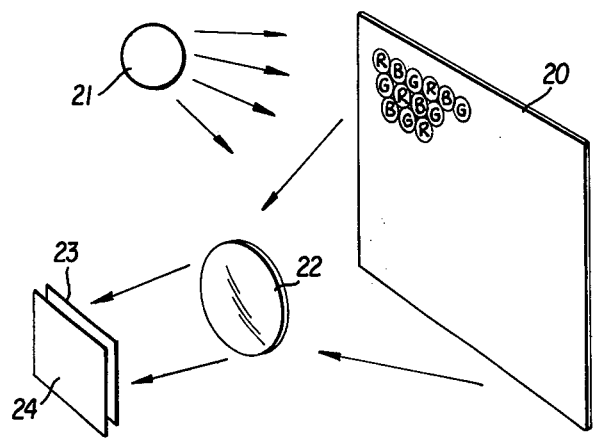
FIG. 2
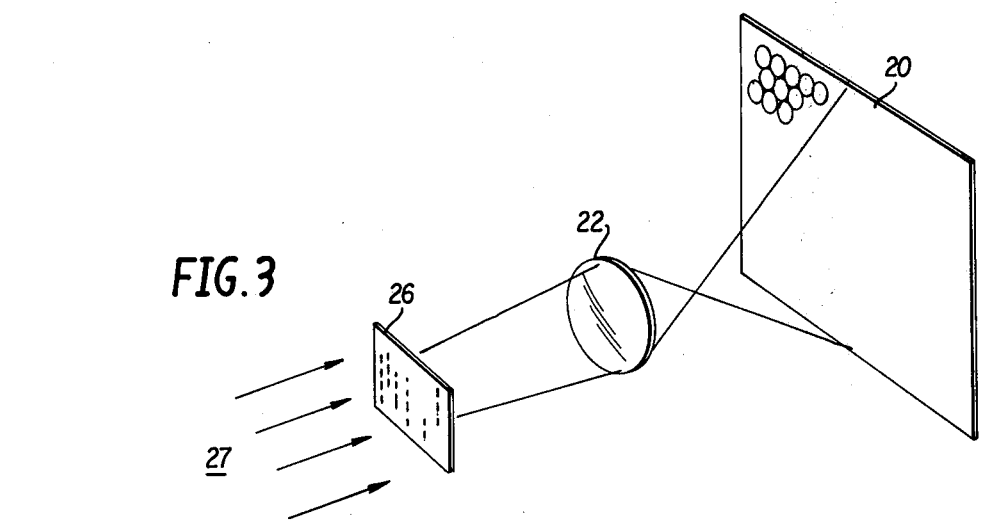
FIG. 3

DISPLAY OF MULTICOLOR IMAGES USING A SCREEN WITH RED, BLUE AND GREEN PHOTOLUMINESCENT SEGMENTS

This is a division of application Ser. No. 239,594, filed Mar. 30, 1972 now U.S. Pat. No. 3,823,412.

BACKGROUND OF THE INVENTION

The present invention is in the field of optics, and is specifically directed to photoluminescent viewing screens in holographic storage and retrieval systems.

SUMMARY OF THE INVENTION

In one of its aspects, the present invention takes advantage of photoluminescence — the absorption of light at one wavelength and the subsequent emission at another wavelength — to overcome the limitation on color ranges from presently available lasers and the unlikelihood of any imminent development of a multicolor laser source. According to the invention, a viewing screen is coated with a closely spaced array of red, green and blue photoluminescent segments to produce bright, speckle-free multicolor displays when appropriately encoded images are projected thereon. Inorganic rare earth phosphors or organic fluorescent dye phosphors are suitable photoluminescent materials.

To ensure satisfactory color registration, the projected image must be critically aligned with respect to the screen. However, the registration problem is substantially eliminated when the image is projected from a near Fourier transform hologram.

BRIEF DESCRIPTION OF THE DRAWINGS

FIGS. 1A and 1B are front and side views of a viewing screen for multicolor displays, showing two possible shapes of the photoluminescent segments;

FIG. 2 is a recording arrangement for encoding a black and white film with color information;

FIG. 3 is a readout arrangement for producing a multicolor display using a coded black and white transparency derived from the film exposed in the arrangement of FIG. 2;

DETAILED DESCRIPTION

Figure 4:
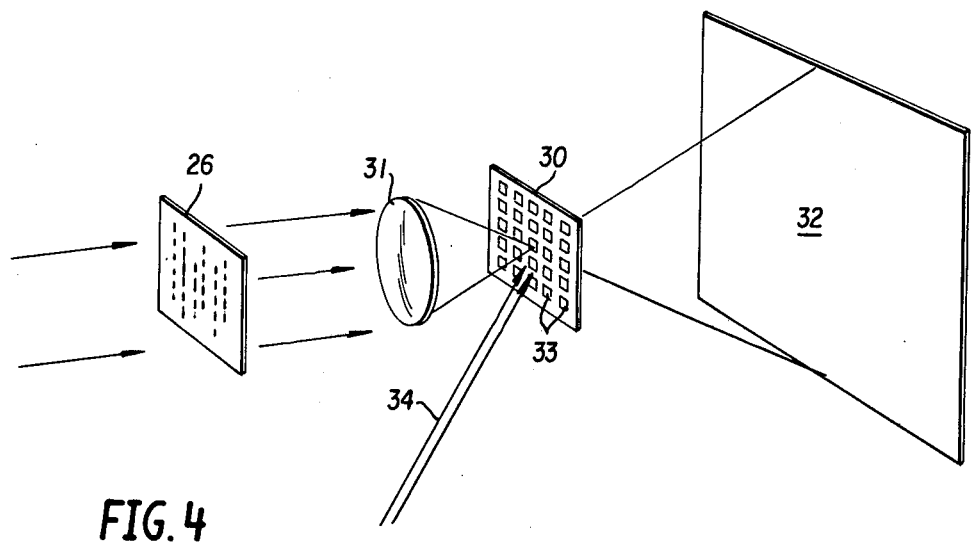
FIG. 4 is a holographic recording arrangement for obtaining full color displays.

Referring to FIGS. 1A and 1B, a suitable viewing screen for multicolor displays comprises a substrate 10 capable of accepting a primer dye and a coating composition pigmented with photoluminescent materials such as inorganic rare earth phosphors or organic dye phosphors. The organic dye phosphors are preferred because they are readily available and simple to apply using conventional silk screen printing techniques. Moreover, such dye phosphors are characterized by strong fluorescence over a broad portion of the visible spectrum. They absorb short wavelength light and subsequently emit light with a particular color (selectable according to the particular dye) in the range from blue to bright red.

Because of its high dimensional stability, glass is the preferred substrate for the screen. However, any of a variety of other materials may be used if desired. These include paper, plywood, aluminum and plastic film (e.g., Mylar). Since the conversion efficiency and image contrast of the screen is superior when the substrate is reflective rather than transparent, the glass plate 10 is blackened with a suitable dye to render it non-transmissive to light.

Fluorescent dyes of the three primary colors are printed on the face of the substrate in a regular array of alternating red, green and blue segments. Preferably, these segments are of circular shape and are spaced slightly from one another, to create a matrix of red, green and blue dots surrounded by black areas. Of course, other segment shapes such as stripes of alternating primary colors separated by thinner black lines may be used if desired. These two segment shapes (i.e., dots and stripes) are shown in FIG. 1A for the sake of illustration only; obviously each screen contains a matrix of fluorescent dye segments of one shape only. Prior to application of the fluorescent dye dots to the substrate by silk screen printing, a matrix of white primer dots 11 is printed on the substrate in accordance with the desired dot pattern. This assures good adherence and reflectivity of the multicolor dots 12 which are overcoated on the primer dots. In a constructed embodiment the diameter of each dot was approximately 1 mm, the spacing between centers of adjacent dots was 1.5 mm, and the coating thickness was about 1.0 mm. Preferably, however, the dot diameter should be as small as is practicable and the coating thickness may range from about 250 microns to about 2.5 mm.

Such a passive viewing screen, coated with a closely spaced array of red, green and blue photoluminescent dots or with repetitive red, green and blue photoluminescent stripes, is capable of producing multicolor displays when used with a single short wavelength illuminating source and appropriately coded projected image. A preferred coding scheme is illustrated in FIG. 2. The multicolor fluorescent viewing screen 20 is illuminated with a short wavelength or white illumination source 21 and is imaged onto a recording plane via a lens 22. At the recording plane the desired input multicolor transparency 23 containing information which is ultimately to be displayed on the screen 20 is placed in contact with unexposed panchromatic recording film 24 or other suitable recording medium. The recording medium should be of a type which is sensitive to light of all colors in the visible spectrum. The image reflected from viewing screen 20 contains a multicolor array of dots (constituting the red, blue and green segments in the illustrative embodiment of FIG. 2). This multicolor array is spatially modulated by the multicolor transparency 23 in the light path between lens 22 and film 24, to encode the multicolor input scene on the film. As previously observed, the transparency and the film are both positioned in the recording plane, preferably, although some slight displacement in parallel planes is permissible. After exposure, developing and subsequent processing of the film, a coded black and white transparency is obtained therefrom for use in the readout arrangement. That is, the black and white transparency contains a coded array of the original multicolor dots, overlapping in some regions, from which a faithful multicolor reproduction of the scene (or other information) on multicolor transparency 23 may be derived in the following manner.

Referring to FIG. 3, the encoded black and white transparency 26 is positioned in the original recording plane of the arrangement of FIG. 2, in place of multicolor transparency 23 and panchromatic film 24. The transparency 26 should be positioned such that the recorded array of dots is located with respect to viewing screen 20 precisely as the array was originally recorded on the film 24. When illuminated from the rear with a short wavelength illumination source 27 the coded transparency 26 is imaged by lens 22 onto the fluorescent multicolor viewing screen 20, to generate a multicolor display. A replica of the multicolor display which would be generated using the original multicolor transparency 23 illuminated with white light and projected on a standard white screen is obtained provided that the coded black and white transparency 26 is in exact registration with the array of the viewing screen 20. This is most readily achieved by positioning transparency 26 in precisely the same location as was occupied by film 24 during recording (assuming the B/W transparency and the recorded film are the same size). Alternatively, the B/W transparency may be translated to the left or right, or up or down, within the original recording plane until the desired color display is obtained.

The advantage of this technique is that a single monochromatic laser source in conjunction with a developed color-coded B/W recording medium can be used to generate a multicolor display on the fluorescent viewing screen. However, the period between dots (i.e., dot size and spacing) must be sufficiently small that an observer is unable to detect separate dots. As a consequence, the projection system must be critically aligned with respect to the screen to insure satisfactory color registration. Any small displacement of the input transparency is magnified by the projection lens 22. For the sake of example, if each photoluminescent dot of screen 20 has a diameter of 1 mm and the projection lens magnification is 100, a 5 micron lateral displacement of input transparency will result in a misregistration between the magnified image and the viewing screen of 0.5 mm at the viewing screen plane.

This problem of critical alignment may be substantially circumvented by use of holographic storage and retrieval techniques together with the basic display method and system described above. To that end, and with reference to FIG. 4, a holographic recording medium 30 is positioned in or near the Fourier transform plane of an imaging/transform lens 31 illuminated by the signal beam from coded B/W transparency 26. To obtain the signal beam, which contains information encoded in transparency 26, the transparency is illuminated from the rear by a coherent beam of short wavelength laser light. In other words, the signal beam is modulated by the encoded transparency, and is then transferred to the hologram storage location by lens 31. The lens projects an image of the encoded data on an image plane 32. Because projection magnification is relatively low (e.g., a full size image is projected on plane 32), the registration tolerances are relaxed. Lens 31 forms the Fourier transform of the encoded input data at or in the vicinity of the hologram recording medium 30. It will be appreciated that medium 30 may consist of an array of holograms 33 which are recorded in the same manner from a set of B/W transparencies which includes transparency 26.

A reference beam 34 of light derived from the same coherent source as the signal beam is incident on the hologram location of interest at an angle (i.e., off-axis) relative to the signal beam. The interference pattern of the two beams is recorded at the specific storage location to form a hologram of the input data. After a hologram is recorded, a different encoded B/W transparency of the set of transparencies is indexed into position and the holographic storage medium 30 is translated to place an unexposed storage location 33 at the Fourier transform location. The next hologram is then recorded at this new address, and so on in a step-and-record process. In a constructed embodiment, the aperture of each hologram was approximately 1 mm, the center spacing between adjacent holograms was 1.5 mm, and the projection magnification ranged from 150 to 200. Holograms were recorded (and read out) with the 488 nm line of an argon laser.

Figure 5:
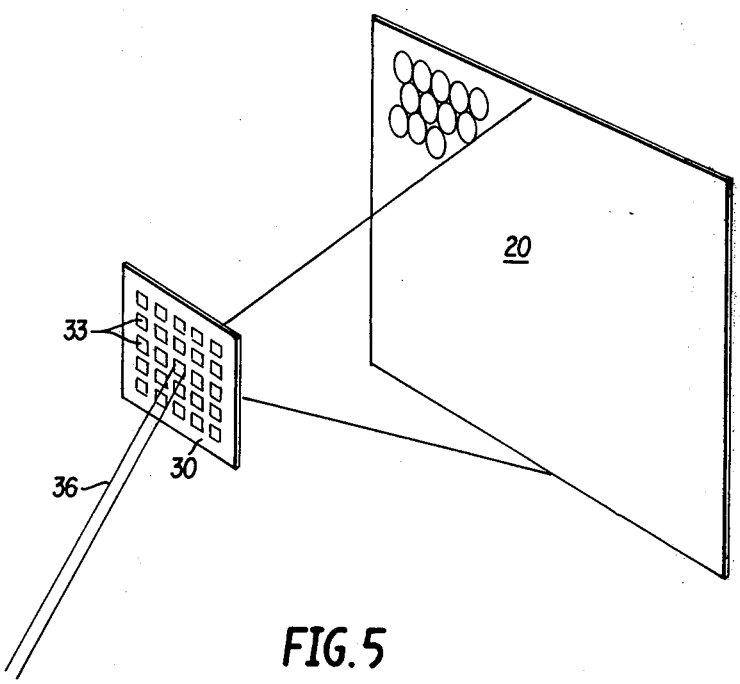
FIG. 5 is a readout arrangement using the holograms obtained in the recording system of FIG. 4.

An arrangement for reading out the holograms is shown in FIG. 5. When a hologram 33 is addressed by a readout beam 36 corresponding to reference beam 34, an image of the input data is formed at the readout plane (image plane 32) where a fluorescent multicolor viewing screen 20 is located. Thereby, a full color display is achieved. The critical positional tolerances of the previously described nonholographic system are no longer present. At worst, a slight lateral displacement of hologram position creates an identical lateral displacement of image position, because there is no magnifying lens between the hologram 33 and the viewing screen 20. Moreover, if exact Fourier transform holograms are recorded, rather than near Fourier transform holograms, their invariant property allows displacement of the hologram with no corresponding image displacement.

As previously observed, photoluminescent multicolor viewing screens convert incident coherent light to incoherent light and thus have the additional advantage of substantially eliminating the objectionable speckle and scintillation phenomena generally associated with direct viewing of diffusely scattered laser light. Furthermore, the displays produced by such displays are characterized by striking brightness.

What is claimed is:

1. An apparatus for displaying a multicolor image wherein the colors of the image are formed by a plurality of basic colors or a combination thereof comprising means defining a display area for the image including a plurality of light excitable light emitting elements within said area for each of said basic colors, all of said elements being excitable by light to emit the respective color in accordance with the intensity of the exciting light, said elements for each color being spaced from adjacent elements of the same color to define a desired resolution for the color within the image, said elements forming a regular array of alternating red, blue and green elements, and means for projecting light onto said display area including record means having coded information thereon projectable as a plurality of image segments of respective light intensities in accordance with said coded information with each segment corresponding to a said element to be excited, said record means comprising a black and white transparent medium and said coded information thereon comprising a regular array of alternating first, second and third sections which are geometrically similar to said regular array of alternating red, blue and green elements, with all of said first sections, said second sections and said third sections containing information in terms of transparency about only red, only blue and only green respectively present in portions of a multicolor subject, and means for illuminating said record means to cast said plurality of image segments onto said display area so that each image segment excites a particular light emitting element to emit its respective color and thereby form said multicolor image.

2. A method of displaying a multicolor image wherein the colors of the image are formed by a plurality of basic colors or a combination thereof and a display area for the image is comprised of a plurality of light emitting elements within the area for each of the basic colors, all of which are excitable by light to emit light of the respective color with the elements of each color being spaced from adjacent elements of the same color to define a desired resolution for the color, said elements forming a regular array of alternating red, blue and green elements, comprising the steps of providing a record means having coded information thereon projectible as a plurality of light segments with said coded information, said record means comprising a black and white transparent medium and said coded information thereon comprising a regular array of alternating first, second and third sections which are geometrically similar to said regular array of alternating red, blue and green elements, with all of said first sections, said second sections and said third sections containing information in terms of transparency about only red, only blue and only green respectively present in portions of a multicolor subject, and illuminating said record means to cast said plurality of image segments onto said display area so that each said segment illuminates a respective one of said elements so that the illuminated elements are excited to emit their respective colors in accordance with said coded information to form a multicolor image.

* * * * *